(12) United States Patent
Bossenmaier et al.

(10) Patent No.: US 7,204,510 B2
(45) Date of Patent: Apr. 17, 2007

(54) OCCUPANT RESTRAINT SYSTEM LOCATED IN THE REAR PASSENGER COMPARTMENT OF A MOTOR VEHICLE

(75) Inventors: Alban Bossenmaier, Gaeufelden-Nebringen (DE); Ulrich Bruhnke, Ehningen (DE); Klaus Frenzel, Winnenden (DE); Murat Guenak, Ehningen (DE); Joerg Hensel, Sindelfingen (DE); Peter Maly, Eutingen im Gaeu (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/485,520

(22) PCT Filed: Jun. 1, 2002

(86) PCT No.: PCT/EP02/06025

§ 371 (c)(1),
(2), (4) Date: Jan. 12, 2005

(87) PCT Pub. No.: WO03/013914

PCT Pub. Date: Feb. 20, 2003

(65) Prior Publication Data

US 2005/0121886 A1   Jun. 9, 2005

(30) Foreign Application Priority Data

Aug. 2, 2001 (DE) ................. 101 37 824

(51) Int. Cl.
*B60R 21/20* (2006.01)

(52) U.S. Cl. ................. 280/730.2; 280/728.3

(58) Field of Classification Search ............. 280/730.2, 280/728.3
See application file for complete search history.

(56) References Cited

U.S. PATENT DOCUMENTS 5,072,966 A   12/1991 Nishitake et al.
5,222,761 A * 6/1993 Kaji et al. ............... 280/730.2

(Continued)

FOREIGN PATENT DOCUMENTS

DE   195 15 851 A1   11/1995

(Continued)

OTHER PUBLICATIONS

English translation of Japanese Office Action dated Jul. 21, 2006 (two (2) pages).

*Primary Examiner*—Lesley D. Morris
*Assistant Examiner*—Drew J. Brown
(74) *Attorney, Agent, or Firm*—Crowell & Moring LLP

(57) ABSTRACT

In order to provide an occupant restraint system located in the rear passenger compartment of a motor vehicle, which system increases the safety of vehicle occupants and at the same time can be produced simply and therefore cost-effectively, an occupant restraint system located in the rear passenger compartment of a motor vehicle, having a side airbag module which comprises a gas bag and a gas generator and is arranged next to that side of a rear seat which faces the side body is proposed, a cover being provided in front of the side airbag module in the direction of travel, and the cover consisting of elastically deformable material and being an integral component of a side member of the rear seat or of an arm support arranged in the region of the side body.

7 Claims, 2 Drawing Sheets

U.S. PATENT DOCUMENTS

| | | | |
|---|---|---|---|
| 5,308,112 A * | 5/1994 | Hill et al. | 280/730.2 |
| 5,316,336 A * | 5/1994 | Taguchi et al. | 280/730.2 |
| 5,324,072 A * | 6/1994 | Olson et al. | 280/730.2 |
| 5,333,899 A * | 8/1994 | Witte | 280/730.2 |
| 5,431,435 A * | 7/1995 | Wilson | 280/728.3 |
| 5,553,887 A | 9/1996 | Karlow et al. | |
| 5,564,735 A * | 10/1996 | Boy et al. | 280/730.2 |
| 5,678,853 A * | 10/1997 | Maly | 280/730.2 |
| 5,730,464 A * | 3/1998 | Hill | 280/743.2 |
| 5,967,546 A | 10/1999 | Homier et al. | |
| 6,007,089 A * | 12/1999 | Gotz et al. | 280/728.3 |
| 6,341,797 B1 | 1/2002 | Seo | |
| 6,378,896 B1 * | 4/2002 | Sakakida et al. | 280/730.2 |

FOREIGN PATENT DOCUMENTS

| | | |
|---|---|---|
| DE | 195 28 627 C1 | 10/1996 |
| EP | 0 940 299 B1 | 1/2005 |
| JP | 4 135942 A | 5/1992 |
| JP | 8-40176 A | 2/1996 |
| JP | 11-152005 A | 6/1999 |
| JP | 2000 052904 A1 | 2/2000 |

* cited by examiner

OCCUPANT RESTRAINT SYSTEM LOCATED IN THE REAR PASSENGER COMPARTMENT OF A MOTOR VEHICLE

CROSS REFERENCE TO RELATED APPLICATIONS

This application is a national phase of International Patent Application No. PCT/EP02/06025, filed Jun. 1, 2002, designating the United States of America, and published in German as WO 03/013914 A1, the entire disclosure of which is incorporated herein by reference. Priority is claimed based on German Patent Application No. 101 37 824.6, filed Aug. 2, 2001.

BACKGROUND AND SUMMARY OF THE INVENTION

The present invention relates to an occupant restraint system located in the rear passenger compartment of a motor vehicle.

If, some time ago, airbags were still special equipment features of motor vehicles, in particular of the superior class of vehicles, it is customary today that, even in the case of relatively small vehicles, at least one airbag, namely a front airbag in the steering wheel region and optionally a passenger's front airbag, is included as standard equipment.

This also applies increasingly to side airbags which are likewise passive restraint components assigned to a particular vehicle seat. The airbag, in response to a release signal, suddenly is filled with gas, and is deployed between the occupants and the side vehicle body in order thereby, in the event of an impact or other accident, to protect the person sitting in the particular vehicle seat.

In practice, it is generally customary to provide a vehicle seat in such a manner that a seat back has at least one cushion, for example made of foam, which is arranged in front of a seat structure, as seen in the direction of travel, and is enclosed by a fabric. In this case, the fabric runs around the seat structure which is arranged in the seat back. The seat structure serves to stabilize the seat back and customarily consists of a profiled plate.

As a rule, a side airbag module comprises a gas generator and a gas bag. If the module is released, then the sensor-controlled gas generator produces a gas which fills the gas bag for a brief period, with the result that, in order to protect the occupant, a balloon-like protective cushion is formed which immediately becomes slack in order to avoid the occupant impacting against the cushion being thrown back violently. The sensor connected to the side airbag module can be both impact-controlled and can also be based on a precrash sensory mechanism.

EP 0 919 365 A1 discloses an occupant restraint system located in the rear passenger compartment of a motor vehicle, in the form of a side airbag module which is arranged in a vehicle seat. In this case, the airbag module is fastened to the seat structure and is covered with a cushion and a fabric. If the airbag is deployed in response to a release signal, in order, in the event of an impact or other accident, to protect the person sitting in the particular vehicle seat, it has to pass through the cushion and fabric. For this purpose, the cushion and fabric have to be designed in such a manner that there is a passage or a passage is formed during deployment of the airbag. The passage is closed during normal operation of the vehicle and is able to be reliably opened by the force of the deploying airbag. In the prior art, complicated instructions are provided for this purpose in the seat structure in order to tear open the cushion.

The design of a passage of this type is very difficult and very complex. When it is closed, it must not be visible for visual reasons. However, in the event of the airbag being released, it has to be able to be opened reliably and release the airbag. Another complicating factor in the design of the passage is that the location in the rear seat at which the passage is arranged is subjected to severe stress and so the wear of the rear seat back also has to be taken into consideration. The airbag has to be able to emerge just as reliably in the case of a rear seat back which is hardly worn as in the case of a rear seat back which is severely worn. On the other hand, the passage must also not be visible in the case of a severely worn rear seat back or even open without releasing the airbag. A further disadvantage of the known solution is that the opening resistance applied to the airbag is very great, in particular if an occupant is sitting on the vehicle seat. A large amount of force is therefore necessary to enable the airbag to be able to emerge at all. Added to this is the fact that the structural space in a seat is very restricted, which means that it is very complicated to arrange the airbag in the seat without a vehicle occupant incurring a loss in comfort.

For all of these reasons, it is appropriate to arrange a side airbag module next to a rear seat of a motor vehicle. An occupant restraint system for the rear seat of a vehicle, in which the airbag module is arranged next to the seat, is disclosed in DE 195 28 627 C1. The known airbag module is concealed by a flap. That section of the flap which faces forward in the direction of travel bears with its free end against a side body part or panel part, with a gap being formed. The airbag and the gas generator are arranged in the space enclosed by the flap in such a manner that the airbag can be brought out through the gap. When the airbag is brought out, the flap is pushed away in the direction of the vehicle occupant.

The flap is designed as a separate component and arranged next to the rear seat. It has to be produced separately and fitted in the vehicle. This separate flap therefore requires an increased outlay on manufacturing and also an increased outlay on installation. This has a negative effect on the production costs of the motor vehicles. Added to this is the fact that the flap consists, at least in its core, of fixed material which is flexible only to a limited extent namely a spring core. This core produces the risk of injuries. If, during deployment of the airbag, the flap pivots away from the side body or panel in the direction of the occupant situated on the seat and the occupant moves in the direction lateral body or panel due to an impact or other accident, the flap is situated right between the occupant and airbag. Depending on which position the flap assumes in this situation, there is the risk of the vehicle occupant being injured.

Against this background, the invention is based on the object of providing an occupant restraint system located in the rear passenger compartment of a motor vehicle, which system further increases the safety of vehicle occupants and at the same time can be produced simply and therefore cost-effectively.

This object is achieved by an occupant restraint system located in the rear passenger compartment of a motor vehicle, which has a side airbag module which comprises a gas bag and a gas generator and is arranged next to that side of a rear seat which faces the side body. A cover is provided in front of the side airbag module in the direction of travel, and the cover consists of elastically deformable material and is an integral component either of a side member of the rear seat or of an arm support arranged in the region of the side body.

The formation of the cover of the side airbag module from elastically deformable material means that the occupant restraint system according to the invention which is located in the rear passenger compartment of a motor vehicle affords the advantage that some of the energy which is released during the deployment is absorbed by the cover. In other words, the airbag can deposit some of its volume in the deformable material of the cover. This prevents the occupant from being injured by the deploying airbag.

Added to this is the fact that, during deployment, the side airbag initially presses against the cover. The cover, in turn, thereupon presses against the occupant who is possibly "out-of-position". The occupant is thereby initially pushed by the cover and then opens up the outlet for the airbag, with the result that the occupant is also protected by the airbag when he is "out-of-position". This happens above all frequently in the case of children who generally sit on the rear seats of a motor vehicle.

The design of the airbag cover as an integral component of structures located in the vehicle also furnishes an advantage with regard to the costs during installation and manufacturing. The integral formation of the cover on a side member of a rear seat does not constitute an increased outlay in the manufacturing. If the cover is to consist of the same material as the seat cushion, use has merely to be made of a different shape for the production of the cushion. This shape only has to be changed once and then the outlay on manufacturing is the same. A considerable amount of time is saved on the installation in comparison with the prior art because only the seat with its side members has to be placed into the body. Further steps are not necessary. In contrast with the prior art, the installation of a separate flap is therefore rendered superfluous. The omission of this working step provides considerable advantages in terms of time and therefore costs, particularly in series manufacturing.

The same applies if the cover is designed as an integral component of the arm support. An arm support is generally provided with a cushion extending over the panel attached to the side body. The invention makes provision for the cushion to be extended to the rear and upward and for it therefore to be able to be used as a cover for the side airbag module.

The arrangement of the airbag next to the seat is advantageous because considerably more space is available there than in a rear seat of a vehicle. This ensures a reliable emergence of the airbag because, owing to the larger structural space which is available, the opening resistance is lower in comparison with an airbag which is arranged in the seat.

The cover preferably consists of the same material as the cushion of the seat and arm support and is also covered with the same fabric. This results, firstly, in the cost-reducing advantages which have already been explained for the installation and, secondly, in a visually attractive interior in which the arrangement of side airbags is not conspicuous because the fabric is matched to its surroundings. A complex concealment of an airbag cover, as in the case of known airbag lids integrated, for example, in a dashboard, is therefore not required.

Provision may be made for the cover, which is an integral component of a side member, to be fastened releasably to the side body or the side panel. This has the advantage that a gap which may impair the visual impression of a vehicle interior is not provided between the seat and panel.

Below the airbag cover an airbag lid may additionally be provided. The airbag lid may, however, also be replaced by the cover according to the invention.

The side airbag module may be fastened, for example, to a partition wall arranged behind the rear seat and, during deployment, may be supported on the partition wall. The use of the partition wall as a fastening point is advantageous because it is already present and additional, adequately stable fastening devices do not have to be fitted. If the cover is an integral component of the arm support arranged in the region of the side body, the airbag module can be arranged in the side panel and can be supported on the side panel. In this situation too, additional, adequately stable fastening devices are not necessary.

BRIEF DESCRIPTION OF THE DRAWINGS

The invention is explained in greater detail below with reference to exemplary embodiments illustrated in the drawing, in which.

DETAILED DESCRIPTION OF THE DRAWINGS

Figure 1:
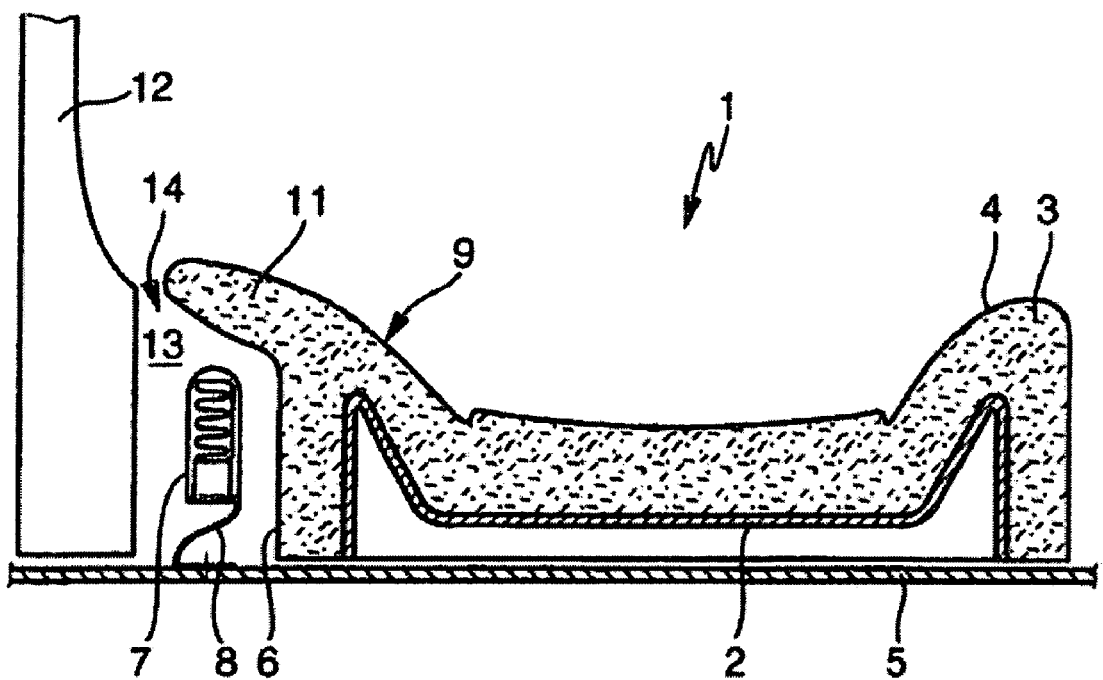
FIG. 1 shows a section through a rear seat and a side panel of a motor vehicle with an occupant restraint system according to the invention which is arranged next to the seat and in which the cover is an integral component of a side member of the rear seat.

FIG. 1 illustrates a rear seat 1 of a motor vehicle. The rear seat comprises a seat structure 2, a seat cushion 3 and a fabric 4 surrounding the seat cushion 3. The seat structure 2, which is arranged in front of a partition wall 5, is used to stabilize the structure of the seat 1. The cushion 3 and fabric 4 are used for comfort purposes and for optimizing the visual impression of the rear seat 1.

A side airbag module 7, which comprises a gas bag and a gas generator, is arranged next to that side 6 of the rear seat 1 which faces the side body of the motor vehicle. The module 7 can be fastened to the partition wall 5 either via a retaining device 8 or preferably directly. Said module is supported on this partition wall 5 during deployment of the gas bag.

The rear seat 1 has an integrally formed extension 11 on its side member 9 assigned to the side body. This extension 11 extends from the side member 9 of the seat 1 in the direction of the side body and, together with the side member 9, the partition wall 5 and the panel 12 attached to the side body, forms a cavity 13. The side airbag module 7 is arranged in this cavity 13. The extension 11 forms a cover 11 for the side airbag module 7 in the direction of the vehicle interior. The side airbag module 7 is aligned in such a manner that the airbag is deployed forward along the side panel or the side body, when looking in the direction of travel.

The cover 11 consists of the same material as the seat cushion 3 and is covered with the same fabric 4 as the entire rear seat 1. Owing to these facts, the outlay on manufacturing and the outlay on installation are the same as for simple rear seats without an integrally formed cover. All that is necessary is for the shape to be adapted for the seat cushion 3 and somewhat more fabric to be used. The cover 11 can be provided only level with the airbag, but there is no problem in also designing the vehicle seat 1 in such a manner that the cover 11 extends over the entire height of the vehicle seat 1.

In the exemplary embodiment illustrated in FIG. 1, there is a gap 14 between the cover 11 and side panel 12. However, provision may also be made to connect the cover 11 releasably to the side panel 12. This releasable connection has to be designed in such a manner that it can be reliably released by the emerging airbag.

When the signal-controlled airbag is released from the side airbag module 13, it pushes against the cover 11. Since the cover 11 consists of elastically deformable material, it is first of all compressed and then also pressed against the side in the direction of the vehicle occupant and therefore opens up the path for the deploying airbag. If the cover 11 is connected releasably to the side panel 12, it has to be opened by the emerging airbag. Owing to the fact that the airbag initially pushes against the cover 11, some of the energy released during the deployment is absorbed. The airbag can therefore deposit some of its volume partially in the elastically deformable material of the cover 11. This prevents the occupant from being injured by the deploying airbag.

Added to this is the fact that, during deployment, the airbag initially presses against the cover 11. The cover 11 in turn thereupon presses against the occupant who is possibly "out-of-position". The occupant is thereby initially pushed by the cover 11 and then opens up the outlet for the airbag. Injuries to the vehicle occupant are therefore at least reduced, and the occupant is also protected by the side airbag when he is "out-of-position".

Figure 2:
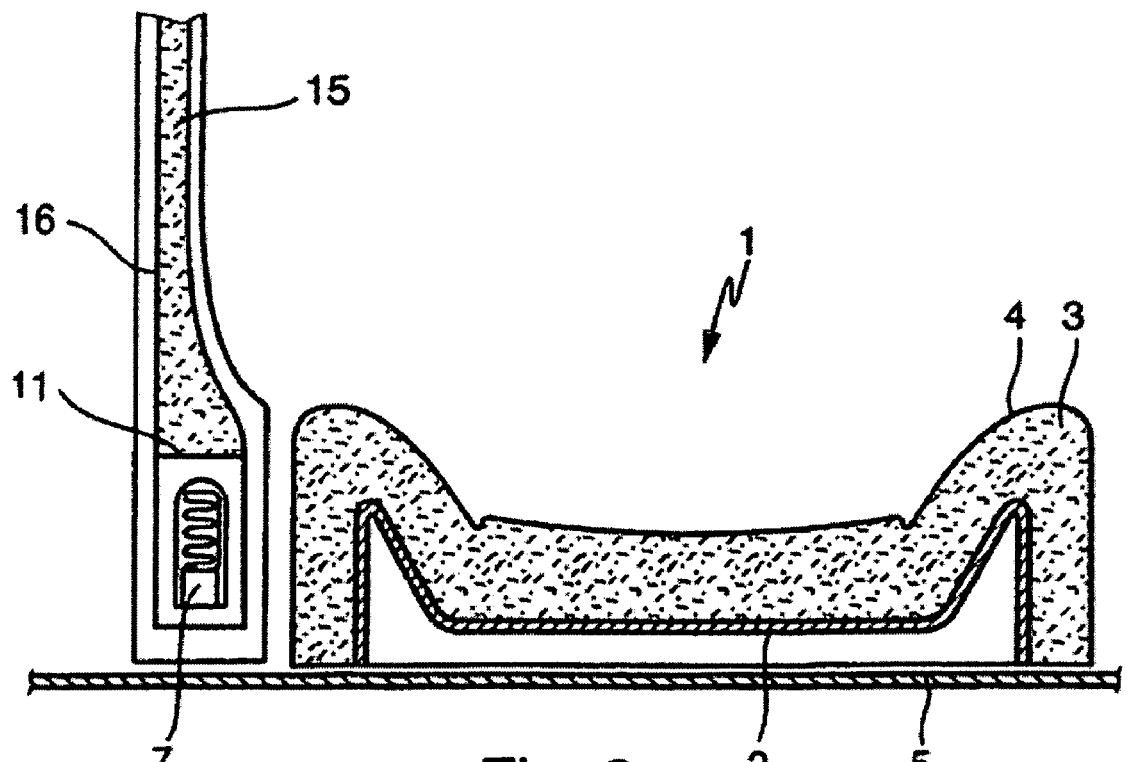
FIG. 2 shows a section which corresponds to FIG. 1 and in which the cover is an integral component of an arm support.
Figure 3:
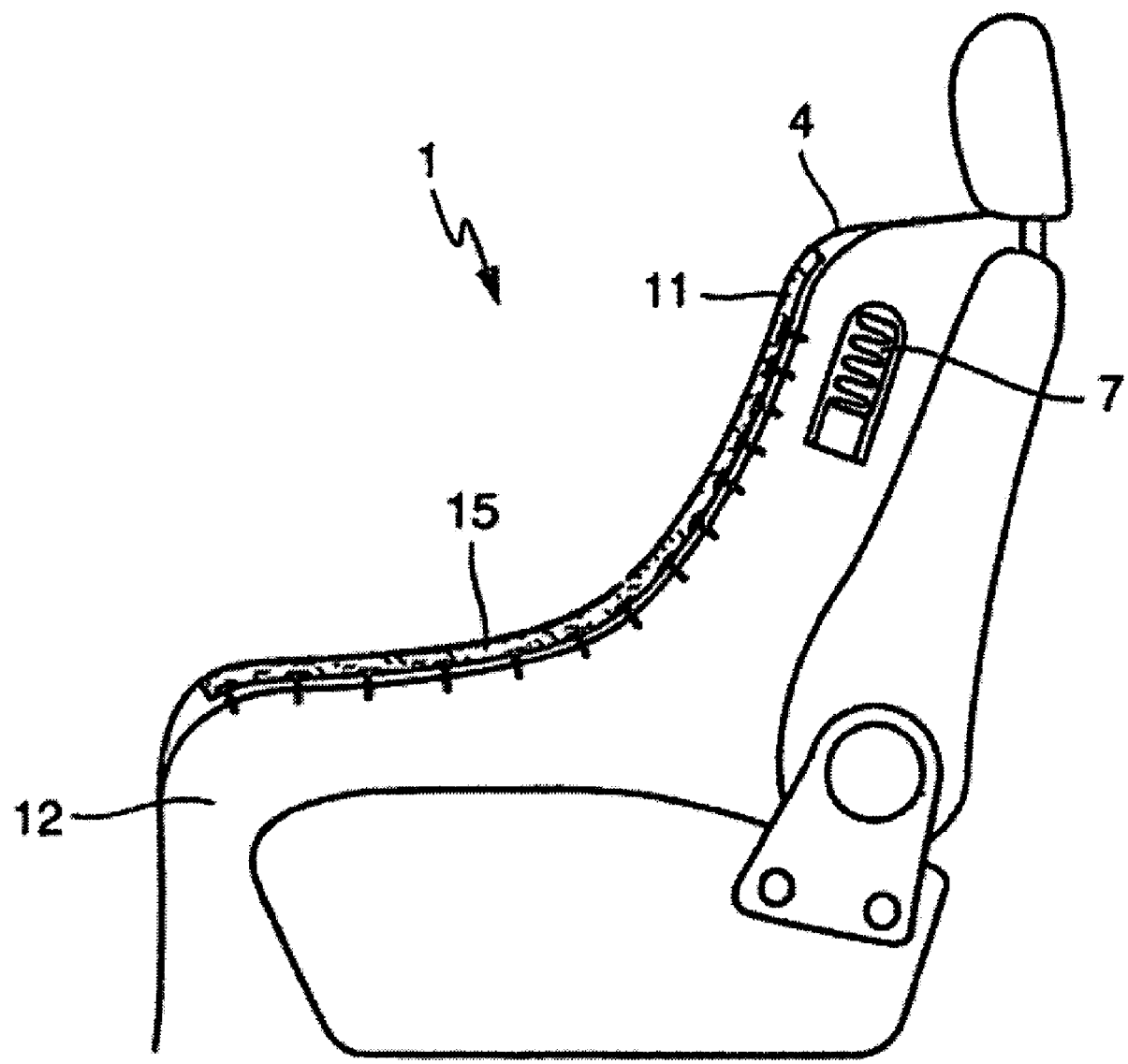
FIG. 3 shows a side view of a rear seat in a motor vehicle with a side panel which is arranged behind it and has an occupant restraint system according to the invention in which the cover is an integral part of a side member of the rear seat.

FIGS. 2 and 3 illustrate a further exemplary embodiment of the occupant restraint system according to the invention. In this variant, the side airbag module 7, which comprises a gas bag and gas generator, is arranged in that side panel 12 of the vehicle which is arranged in front of the side body. Said module can be fastened directly to the side body or to the panel. A fastening to stable parts which are arranged behind the airbag module 7 in the direction of travel is preferred so that the airbag can be optimally supported during deployment.

As a rule, in vehicles which do not have rear doors, the side panel 12 is provided with an armrest which has a cushion 15 for comfort purposes. This cushion is covered by a fabric 4. According to the invention, this cushion 15 extends rearward and upward beyond the pure arm support surface and therefore forms a cover 11 for the side airbag module 7.

The cushion 15 is fastened to the panel 12, at least in the region of the cover 11, in such a manner that it is detached at least on one side by the deployment of the airbag and can then be folded away to the side when the airbag is released. The seam which faces the outside of the vehicle is preferably to be designed as an easily releasable connection of this type. The cushion 15 thereby folds shut in the region of the cover 11 when the airbag is released toward the occupant and in the process affords the advantage described in detail in conjunction with the exemplary embodiment illustrated in FIG. 1, so that the risk of a direct impairment of the vehicle occupant by the deploying airbag is considerably reduced.

The invention claimed is:

1. An occupant restraint system located in a rear passenger compartment of a motor vehicle, comprising a side airbag module which comprises a gas bag and a gas generator and which is arranged next to a side of a rear seat that faces a side body of the motor vehicle so as to deploy in a direction of vehicle travel, a cover being provided in front of the side airbag module in the direction of vehicle travel and joined thereto by a seam, wherein the cover includes elastically deformable material and is an integral component of an arm support arranged in the region of the side body, the elastically deformable material being arranged to absorb energy initially released upon deployment of the side airbag module gas bag and to be interposed between a vehicle passenger and the deployed gas bag without destruction of the seam such that the cover can be folded away thereafter.

2. The occupant restraint system as claimed in claim 1, wherein the cover includes foam.

3. The occupant restraint system as claimed in claim 1, wherein the cover is covered with a fabric.

4. The occupant restraint system as claimed in claim 3, wherein the cover forms an airbag lid.

5. The occupant restraint system as claimed in claim 4, wherein the side airbag module is arranged in the side panel.

6. The occupant restraint system as claimed in claim 5, wherein the side airbag module is arranged in such a manner that it is deployed forward, when looking in the direction of travel.

7. The occupant restraint system as claimed in claim 6, wherein the arm support is fastened releasably to the panel at least in the region of the cover.

\* \* \* \* \*